United States Patent [19]

Takagi

[11] Patent Number: 5,481,688
[45] Date of Patent: Jan. 2, 1996

[54] INFORMATION PROCESSING SYSTEM HAVING AN ADDRESS TRANSLATION TABLE LOADED WITH MAIN/EXPANDED MEMORY PRESENCE BITS

[75] Inventor: Hitoshi Takagi, Tokyo, Japan

[73] Assignee: NEC Corporation, Tokyo, Japan

[21] Appl. No.: 20,369

[22] Filed: Feb. 22, 1993

[30] Foreign Application Priority Data

Feb. 21, 1992 [JP] Japan .................................. 4-035198

[51] Int. Cl.$^6$ .................................................. G06F 12/10
[52] U.S. Cl. ..................... 395/418; 395/419; 364/DIG. 1
[58] Field of Search ..................................... 395/425, 375, 395/275, 400

[56] References Cited

U.S. PATENT DOCUMENTS

| | | | |
|---|---|---|---|
| 4,279,014 | 7/1981 | Cassonnet et al. | 395/400 |
| 4,476,524 | 10/1984 | Brown et al. | 395/425 |
| 4,669,043 | 5/1987 | Kaplinsky | 395/425 |
| 5,129,070 | 7/1992 | Dorotte | 395/400 |
| 5,182,799 | 1/1993 | Tamura et al. | 395/400 |
| 5,233,700 | 8/1993 | Takagi | 395/400 |
| 5,237,668 | 8/1993 | Blandy et al. | 395/400 |
| 5,347,636 | 9/1994 | Ooi et al. | 395/400 X |

FOREIGN PATENT DOCUMENTS 0214870  3/1987  European Pat. Off. .

OTHER PUBLICATIONS

Enterprise System Architecture/390 Principles of Operation Publication No. IBM SA 22–7201–0, Oct. 1990, pp. 7–39 to 7–41.

Primary Examiner—Michael A. Whitefield
Attorney, Agent, or Firm—Foley & Lardner

[57] ABSTRACT

An information processing system has a main memory unit, an expanded memory unit, and an instruction processing unit producing a virtual address. An address translation table, namely, a page table stores page table words which include main/expanded memory presence bits indicating to which memory unit of the main memory unit and the expanded memory unit real pages are stored. Preferably, the instruction processing unit may include an access type determiner for determining an access type for at least one operand. The access type indicates which memory unit is the optimum one for the operand. Instead of the access type determiner, the instruction processing unit may include segment descriptor registers for storing segment descriptors having expanded memory bits indicating which memory units are the optimum ones for the segments. In place of the access type determiner, the instruction processing unit may include virtual space registers for indicating virtual space numbers identifying a plurality of virtual spaces and an access type determining circuit for determining which memory unit is the optimum one for a designated virtual space.

4 Claims, 10 Drawing Sheets

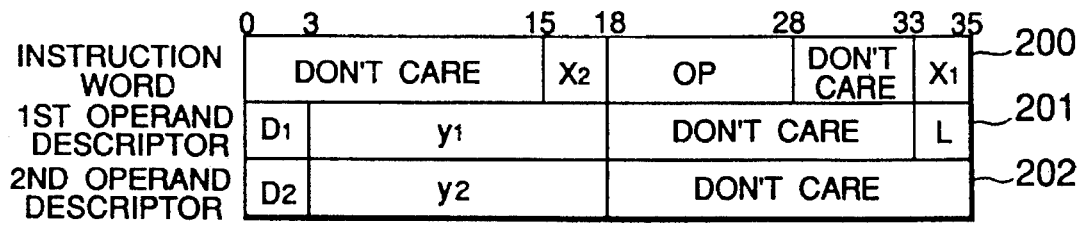

| | 0 3 | 15 18 | 28 33 35 | |
|---|---|---|---|---|
| INSTRUCTION WORD | DON'T CARE | $X_2$ | OP | DON'T CARE | $X_1$ | 200 |
| 1ST OPERAND DESCRIPTOR | $D_1$ | $y_1$ | DON'T CARE | L | 201 |
| 2ND OPERAND DESCRIPTOR | $D_2$ | $y_2$ | DON'T CARE | | 202 |

OP : INSTRUCTION CODE
Xi : INDEX REGISTER NUMBER FOR OPERAND i
Di : SEGMENT DESCRIPTOR REGISTER NUMBER FOR OPERAND i
yi : ADDRESS FOR OPERAND i
L : TRANSFER LENGTH SPECIFYING REGISTER NUMBER

| OP | MNEMONIC | OPERATION |
|---|---|---|
| 000 000 1101 | MMEP | MOVE MAIN MEMORY TO EXPANDED MEMORY PAGED |
| 000 000 1111 | MEMP | MOVE EXPANDED MEMORY TO MAIN MEMORY PAGED |

LOGIC FOR ACCESS TYPE DETERMINER

OP = 000 000 1101 ⟶ 1ST OPERAND MAIN MEMORY ACCESS
                                        2ND OPERAND EXPANDED MEMORY ACCESS

OP = 000 000 1111 ⟶ 1ST OPERAND EXPANDED MEMORY ACCESS
                                        2ND OPERAND MAIN MEMORY ACCESS

FIG. 2

MEANING OF FLAG FIELD

| BIT | MEANING OF '1' |
|---|---|
| 20 | READABLE |
| 21 | WRITABLE |
| 22 | EXPANDED MEMORY BIT |
| 23 | LOADING FOR CACHE MEMORY |
| 24 | EXTENDED VIRTUAL SPACE MODE |
| 25 | EXECUTABLE |
| 26 | PRIVILEGE |
| 27 | BOUND FIELD IS VALID |
| 28 | PRESENCE OF SEGMENT |

MPF : MISSING PAGE FAULT
SF : SECURITY FAULT

INFORMATION PROCESSING SYSTEM HAVING AN ADDRESS TRANSLATION TABLE LOADED WITH MAIN/EXPANDED MEMORY PRESENCE BITS

BACKGROUND OF THE INVENTION

This invention relates to an information processing system and, in particular, to a method of designating an area for storing data and a mapping of a virtual space to a real memory unit.

As is well known in the art, an expanded memory unit (EXP MEM) is a storage arrangement positioned between a main memory unit (MN MEM) and an external memory unit (EXT MEM) such as a disk. A combination of the main memory unit and the expanded memory unit is referred to as the real memory unit. The expanded memory unit can only be operable at an access speed lower than that of the main memory unit, though the storage capacity thereof is much larger than that of the main memory unit. It is expected that the performance of the information processing system will be improved by using the expanded memory unit as the area for storing the data which is so far stored in the external memory unit. For example, the expanded memory unit can be used as a temporary memory for a file or a swapped area for virtual memory control.

It is assumed that the main memory unit is operable at a main access speed AS(MN) and has a main storage capacity SC(MN), the expanded memory unit is operable at an expanded access speed AS(EXP) and has an expanded storage capacity SC(EXP), and the external memory unit is operable at an external access speed AS(EXT) and has an .external storage capacity SC(EXT). The following relationships generally hold for the access speed and the storage capacity of the main memory unit, the expanded memory unit and the external memory unit:

$AS(MN) \geq AS(EXP) \geq AS(EXT)$, and $SC(MN) \leq SC(EXP) \leq SC(EXT)$.

The expanded memory unit is assigned with addresses which are independent of those assigned to the main memory unit. The addresses assigned to the main memory unit are called main memory real addresses while the addresses assigned to the expanded memory unit are referred to as expanded memory real addresses.

Inasmuch as the main memory unit, the expanded memory unit and the external memory unit are related to each other, it is necessary to effectively control allocation of data among those memory units in order to improve the performance of the information processing system while taking a full advantage of the expanded memory unit. With respect to this, the present invention is directed to provide a control arrangement which enables the effective control for allocating the data and, in particular, to provide a control arrangement which enables the effective control even when the virtual space control, which is only for the main memory unit in the prior art, is also applied to the expanded memory unit.

The U.S. Pat. No. 4,476,524 issued to Brown et al discloses some prior art regarding the method for controlling memory contents stored in the expanded memory unit and how a programmer recognizes addresses in the expanded memory unit. The prior art disclosed in the above-mentioned patent allows the programmer to recognize only real addresses of addresses in the expanded memory unit. In the information processing system providing multiprogramming where a plurality of programs are run by a plurality of users, a control program (for instance, an operating system) for controlling the information processing system controls the memory contents in the expanded memory unit. A method of controlling the memory contents in the expanded memory unit by the control program is as follows:

1. A user or a program who would like to access the memory contents stored in the expanded memory unit requests that of the control program.
2. The control program checks justice of the request from the user or the program who sent the request, following which it provides access.

As is apparent from the above description, whenever the user or the program accesses the memory contents stored in the expanded memory unit, the prior art disclosed in the above patent requires him or it to do so via the control program. As a result, it takes a long time for processing the memory contents stored in the expanded memory unit in the prior art, which only results in degradation of the processing performance.

A virtual storage control system allows the main memory unit to enlarge a logical storage space, to protect the stored contents, to use data among programs in common, and to effectively use resources by reallocating data on the real memory unit. Through the above-mentioned method of controlling the memory contents stored in the expanded memory unit via the control program, degraded performance of the system will result because of the necessity of doing it via the control program.

If it is possible to apply the virtual storage control system which is, at present, only for the main memory unit to the expanded memory unit and allow the system to control data by a single control system, it is expected to build a fast, high security, flexible information processing system while taking full advantage of the main memory unit, the expanded memory unit and the external memory unit.

One example of applying a conventional virtual storage control system to the expanded memory unit is disclosed in a reference SA22-7201-0 issued by International Business Machines Corporation (October 1990), pages 7–39 to 7–41, under the title of "Enterprise Systems Architecture/390: Principles of Operation". An information processing system disclosed in the above-mentioned reference comprises a page table (an address translation table) for storing page table words where the correspondence is defined between virtual page addresses and main memory page addresses. That is, the information processing system carries out address translation for translating a virtual page address into a main memory page address by using the page table. When a real page corresponding to a virtual page search is absent in the main memory unit, a page-invalid bit in the page table represents "1". In such a case, the information processing system carries out additional address translation to determine to which unit the real page in question is to be stored, the expanded memory unit or the external memory unit. Thus, this technique requires the additional address translation on accessing the contents stored in the expanded memory unit or the external memory unit. In addition, a system control program is activated when the real page is absent in the main memory unit. This program is substantially modified as a result of the additional address translation. Such modification is, however, accompanied by degradation of performance of the program itself. The performance of this program has important effects on that of the information processing system and therefore the addition address translation adversely affects the performance of the information processing system.

The access of the page table or, if necessary, the subsequent additional address translation only reveals in which memory units is the real page stored. The memory unit storing the real page in question is, however, not always the optimum one for it. Another processing is required for determining the optimum memory unit for the real page in accordance with attributes of data (operands) and frequency of access. Thus, it is desired to provide means enabling judgement in which memory units should be the data to be accessed by a program stored.

SUMMARY OF THE INVENTION

It is therefore an object of this invention to provide an information processing system which enables systematic control of an expanded memory unit as well as a main memory unit based on a virtual storage control system.

It is another object of this invention to provide an information processing system of the type described, which is capable of effectively reallocating stored contents between the main memory unit and an external memory unit at a high speed.

Other objects of this invention will become clear as the description proceeds.

According to a first aspect of this invention, an information processing system comprises a main memory unit operable at a relatively high speed and having a relatively small storage capacity, and an expanded memory unit operable at a relatively low speed and having a relatively large storage capacity, a combination of the main memory unit and the expanded memory unit being operable as a real memory unit. The information processing system further comprises an instruction processing unit producing a virtual address, and an address translation table for translating the virtual address into a real address. The address translation table stores page table words, each of which includes a real page address corresponding to a virtual page address, a main/expanded memory presence bit corresponding to the real page address and a page presence bit corresponding to the real page address. The main/expanded memory presence bit indicates to which memory unit of the main memory unit and the expanded memory unit a real page, indicated by the real page address is to be loaded.

The page presence bit indicates whether the real page is present in the real memory unit. The main memory unit is accessible when the main/expanded memory presence bit indicates that the real page should be stored in the main memory unit and the page presence bit indicates presence of the real page in the real memory unit. The expanded memory unit is accessible when the main/expanded memory presence bit indicates that the real page should be stored in the expanded memory unit and when the page presence bit indicates presence of the real page in the real memory unit. The real page is loaded into the main memory unit after production of a missing page fault when the main/expanded memory presence bit indicates that the real page should be stored in the main memory unit and when the page presence bit indicates absence of the real page in the real memory unit. The real page is loaded into the expanded memory unit after production of the missing page fault when the main/ expanded memory presence bit indicates that the real page should be stored in the expanded memory unit and the page presence bit indicates absence of the real page in the real memory unit.

According to a second aspect of this invention, an information processing system comprises a main memory unit operable at a relatively high speed and having a relatively small storage capacity, an expanded memory unit operable at a relatively low speed and having a relatively large storage capacity, and an instruction processing unit for processing an instruction word for accessing at least one operand to produce a virtual address. A combination of the main memory unit and the expanded memory unit is operable as a real memory unit. The instruction processing unit includes access type determining means for determining an access type for the at least one operand on the basis of information included in the instruction word. The access type indicates which memory unit of the main memory unit and the expanded memory unit is the optimum one for the at least one operand. The access type determining means produces an access type bit indicating the access type. An address translation table translates the virtual address into a real address. The address translation table stores page table words, each of which include a real page address corresponding to a virtual page address, a main/expanded memory presence bit corresponding to the real page address, and a page presence bit corresponding to the real page address. The main/expanded memory presence bit indicating to which memory unit of the main memory unit and the expanded memory unit a real page is to be loaded. The page presence bit indicates whether the real page is present in the real memory unit. The main memory unit is accessible when the main/expanded memory presence bit indicates that the real page should be stored in the main memory unit and the page presence bit indicates presence of the real page in the real memory unit. The expanded memory unit is accessible when the main/expanded memory presence bit indicates that the real page should be stored in the expanded memory unit and when the page presence bit indicates presence of the real page in the real memory unit. The real page is loaded into the main memory unit after production of a missing page fault when the main/expanded memory presence bit indicates that the real page should be stored in the main memory unit and when the page presence bit indicates absence of the real page in the real memory unit. The real page is loaded into the expanded memory unit after production of the missing page fault when the main/expanded memory presence bit indicates that the real page should be stored in the expanded memory unit and the page presence bit indicates absence of the real page in the real memory unit.

According to a third aspect of this invention, an information processing system comprises a main memory unit operable at a relatively high speed and having a relatively small storage capacity, an expanded memory unit operable at a relatively low speed and having a relatively large storage capacity, and an instruction processing unit including segment descriptor registers for storing segment descriptors defining segments which are logical data blocks. The segment descriptors include start virtual addresses, segment sizes, and expanded memory bits indicating which of the main memory unit and the expanded memory unit is the optimum one for the segments.

According to a fourth aspect of this invention, an information processing system comprises a main memory unit operable at a relatively high speed and having a relatively small storage capacity, an expanded memory unit operable at a relatively low speed and having a relatively large storage capacity and an instruction processing unit including means for indicating virtual space numbers for identifying a plurality of virtual spaces and means for specifying which of the main memory unit or the expanded memory unit is the optimum one for holding information which resides in a designated virtual space.

BRIEF DESCRIPTION OF THE DRAWING

FIG. 2 shows a format of a data transfer instruction for transferring data between a main memory unit and an expanded memory unit, in which the data transfer instruction is executed on the central processing system depicted in FIG. 1;

DESCRIPTION OF THE PREFERRED EMBODIMENTS

Figure 1:
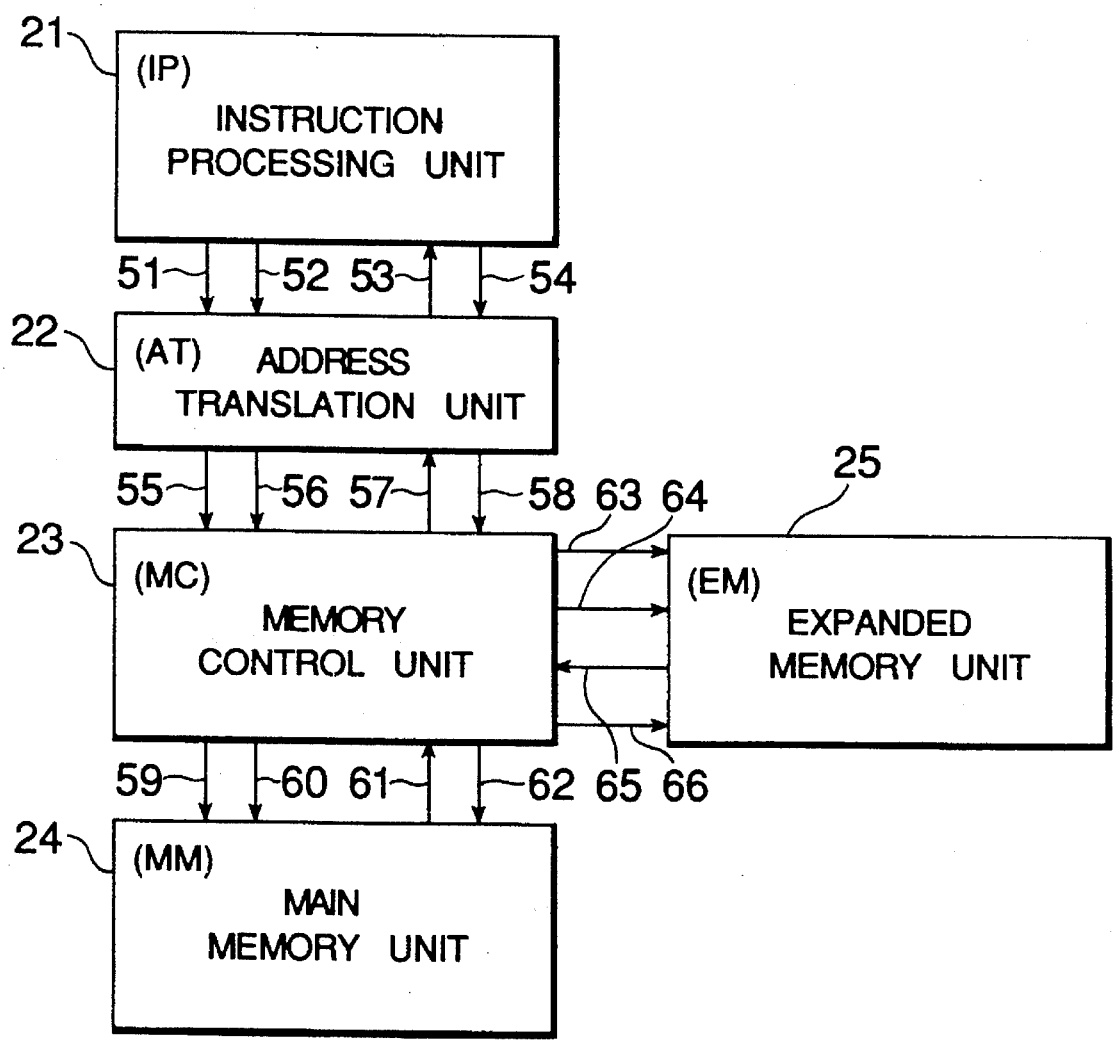
FIG. 1 is a block diagram of a central processing system of a single processor in an information processing system to which the present invention is applicable.

Referring to FIG. 1, description will be given generally as regards a central processing system of a signal processor in an information processing system according to the present invention. The central processing system comprises an instruction processing unit (IP) 21, an address translation unit (AT) 22, a memory control unit (MC) 23, a main memory unit (MM) 24, and an expanded memory unit (EM) 25. A combination of the main memory unit 24 and the expanded memory unit 25 is called a real memory unit.

The instruction processing unit 21 supplies the address translation unit 22 with a virtual address VA and a command via an address bus 51 and a command bus 52, respectively. The instruction processing unit 21 receives readout data/status from the address translation unit 22 via a readout data/status bus 53. The instruction processing unit 21 supplies the address translation unit 22 with writing data via a writing data bus 54. The address translation unit 22 supplies the memory control unit 23 with a real address and a command via an address bus 55 and a command bus 56, respectively. The address translation unit 22 receives readout data/status from the memory control unit 23 via a readout data/status bus 57. The address translation unit 22 supplies the memory control unit 23 with writing data via a writing data bus 58. The memory control unit 23 supplies the main memory unit 24 with a main memory address MMA and a command via an address bus 59 and a command bus 60. The memory control unit 23 receives readout data/status from the main memory unit 24 via a readout data/status bus 61. The memory control unit 23 supplies the main memory unit 24 with writing data via a writing data bus 62. The memory control unit 23 supplies the expanded memory unit 25 with an expanded memory address EMA and a command via an address bus 63 and a command bus 64, respectively. The memory control unit 23 receives readout data/status from the expanded memory unit 25 via a readout data/status bus 65. The memory control unit 23 supplies the expanded memory unit 25 with writing data via a writing data bus 66.

FIG. 2 shows a format of a data transfer instruction. The data transfer instruction is an instruction for carrying out data transfer between the main memory unit 24 and the expanded memory unit 25 that is executed on the central processing system depicted in FIG. 1. In the example being illustrated, the data transfer instruction is classified into two instructions, that is, a first data transfer instruction indicative of transfer of data from the main memory unit 24 to the expanded memory unit 25 and a second data transfer instruction indicative of transfer of data from the expanded memory unit 25 to the main memory unit 24. The first data transfer instruction is called an MMEP instruction while the second data transfer instruction is referred to as an MEMP instruction. Each data transfer instruction consists of an instruction word 200, a first operand descriptor 201, and a second operand descriptor 202. The instruction word 200 comprises an OP field indicative of operation of the instruction in question, an X1 field indicative of the number of an index register for a first operand, and an X2 field indicative of the number of another index register for a second operand. The first operand descriptor 201 comprises a first descriptor (D1) field indicative of a segment descriptor for the first operand, a y1 field indicative of an operand location for the first operand, and an L field indicative of a transfer length of data. Similarly, the second descriptor 202 comprises a second descriptor (D2) field indicative of another segment descriptor for the second operand and a y2 field indicative of another operand location for the second operand.

Figure 3:
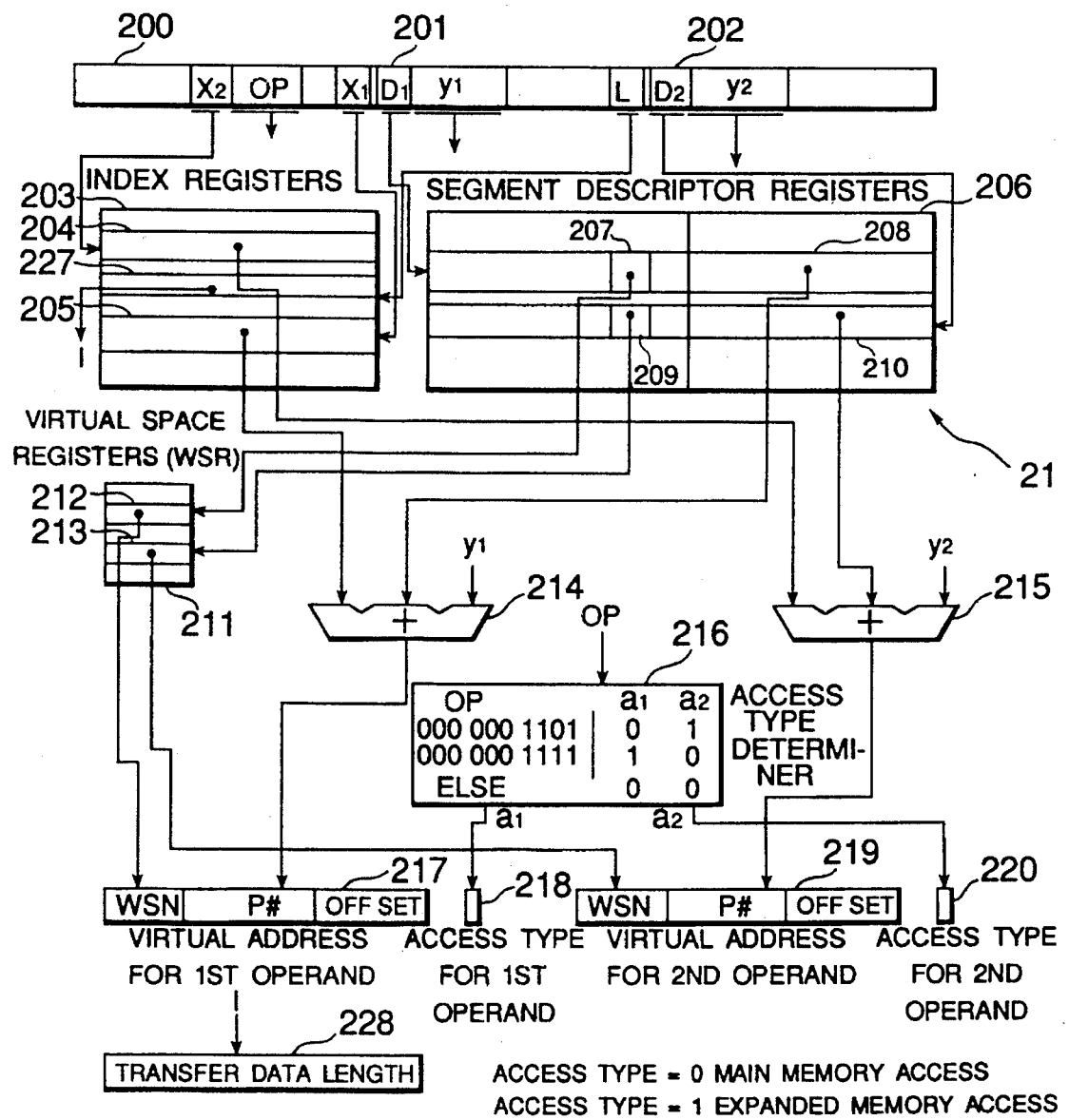
FIG. 3 is a block diagram of an instruction processing unit used in the central processing system depicted in FIG. 1.

Turning to FIG. 3, description will proceed to the instruction processing unit 21 used in the central processing system depicted in FIG. 1. The instruction processing unit 21 processes the data transfer instruction illustrated in FIG. 2 to generate first and second virtual addresses for the first and the second operands and first and second access type bits a1 and a2 for the first and the second operands.

The instruction processing unit 21 is supplied with the data transfer instruction illustrated in FIG. 2. The instruction processing unit 21 comprises index registers 203 each of which stores a base address for the operand and so on. In the index registers 203, an index register 204 is indicated by the X2 field in the instruction word 200 while another index register 205 is indicated by the X1 field in the instruction word 200. The instruction processing unit 21 further comprises segment descriptor registers 206.

Figures 4A, 4B:
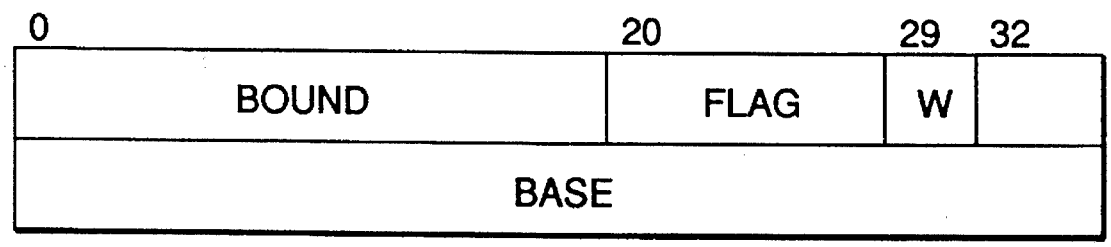
FIG. 4A shows a format of a segment descriptor stored in a segment descriptor register for use in the instruction processing unit depicted in FIG. 3.
FIG. 4B shows a format of a Flag field of the segment descriptor illustrated in FIG. 4A.

Turning to FIGS. 4A and 4B, each of the segment descriptor registers 206 stores segment descriptor defining segments which are logical data blocks. The segment descriptor comprises Base and Bound fields indicative of location and a size in a virtual space of the segment, respectively, and a W field indicative of a virtual space register number of a virtual space register (WSR) for storing a virtual space number (WSN). The segment descriptor further includes a Flag field indicative of an attribute of the segment. The attribute of the segment is shown in FIG. 4B.

Turning back to FIG. 3, the D1 field in the first operand descriptor 201 indicates one of the segment descriptor registers 206 that stores a W field 207 and a Base field 208 while the D2 field in the second operand descriptor 202 indicates another one of descriptor registers 206 that stores another W field 209 and another. Base field 210. The instruction processing unit 21 comprises virtual space registers 211. In the virtual space registers 211, a virtual space register 212 is indicated by the W field 207 while another virtual space register 213 is indicated by the W field 209.

The instruction processing unit 21 yet comprises first and second adders 214 and 215 and an access type determiner 216. The first adder 214 is supplied with contents of the index register 205, the Base field 208, and the y1 field of the first operand descriptor 201. The first adder 214 adds the contents of the index register 205, the Base field 208, and the y1 field to produce a first intra-virtual space address which includes a P# field, where P# represents a page number and an offset field. A combination of the first intra-virtual space address and the virtual space number WSN in the virtual space register 212 composes the first virtual address for the first operand that is stored in a first virtual address register 217. The access type determiner 216 is supplied with the OP field of the instruction word 200. The access type determiner 216 determines a first access type for the first operand on the basis of the OP field to produce a first access type bit a1 indicative of the first access type that is stored in a first access type register 218.

Likewise, the second adder 215 is sup lied with contents of the index register 204, the Base field 210, and the y2 field of the second operand descriptor 202. The second adder 215 adds the contents of the index register 204, the Base field 210 and the y2 field to produce a second intra-virtual space address which includes another P# field and another offset field. A combination of the second intra-virtual space address and the virtual space number WSN in the virtual space register 213 composes the second virtual address for the second operand that is stored in a second virtual address register 219. The access type determiner 216 also determines the second access type for the second operand on the basis of the OP field to produce a second access type bit a2 indicative of the second access type that is stored in a second access type register 220. Each of the first and the second access type bits a1 and a2 is a bit for indicating which memory unit is the optimum one for the operand, the main memory unit 24 or the expanded memory unit 25. In the manner as shown in FIG. 2, the access type is determined based on a table as follows:

TABLE

| OP field (binary) | ACCESS TYPE | |
|---|---|---|
| | 1st operand | 2nd operand |
| 000 000 1101 | MAIN MEMORY ACCESS | EXPANDED MEMORY ACCESS |
| 000 000 1111 | EXPANDED MEMORY ACCESS | MAIN MEMORY ACCESS |

In addition, the L field in the first operand descriptor 201 indicates, as one of the index registers 203, an index register 227 which stores a transfer data length signal indicative of a transfer data length l. The transfer data length signal is stored in a transfer data length register 228.

As described above, the instruction processing unit 21 generates the first and the second virtual addresses for the first and the second operands and the first and the second access type bits a1 and a2 for the first and the second operands. Instructions other than the above-mentioned data transfer instruction are for use in accessing the main memory unit 24. Access types of such instructions indicate that operands thereof should be all found in the main memory unit 24 accordingly.

Figure 5:
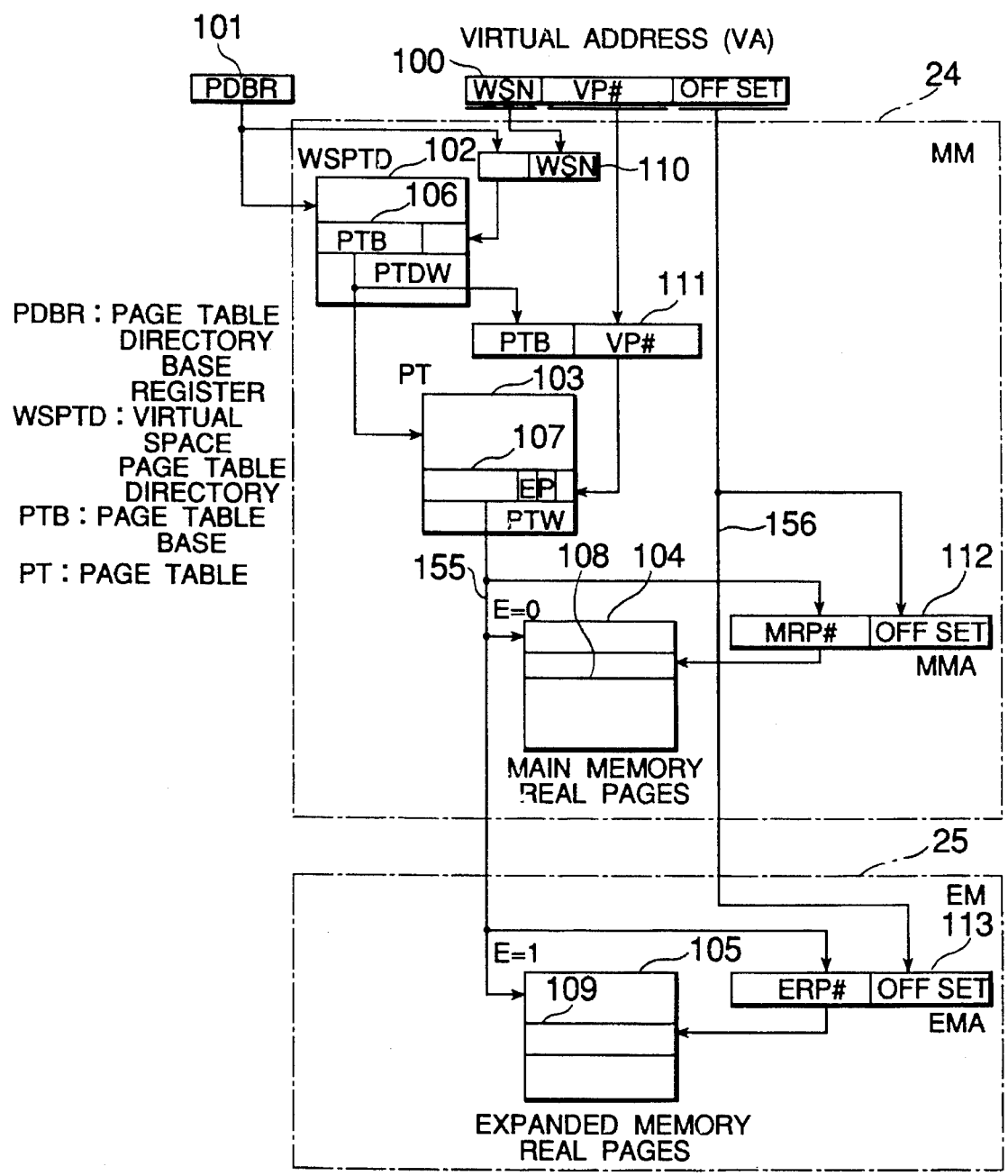
FIG. 5 is a block diagram for use in describing operation of address translation in the information processing system according to the present invention.

Turning to FIG. 5, description will proceed to the address translation unit 22. The address translation unit 22 is supplied with the virtual address VA from the instruction processing unit 21. The address translation unit 22 translates the virtual address VA into a real address by using an address translation table stored in the main memory unit 24.

The virtual address is stored in a virtual address register 100 which corresponds to one of the virtual address registers 217 and 219 illustrated in FIG. 3. A base address is stored in a page table directory base register 101. The main memory unit 24 comprises a virtual space page table directory (WSPTD) 102 for storing page table directory words (PTDW's) and comprises a page table (PT) 103 for storing page table words (PTW's). The page table 103 serves as the address translation table. The main memory unit 24 stores main memory real pages 104. The expanded memory unit 25 stores expanded memory real pages 105. The main memory unit 24 further comprises first through third address registers 110, 111, and 112. The expanded memory unit 25 comprises an address register 113.

Description will proceed to operation of the address translation unit 22. At first, the virtual space page table directory 102 is searched by using the WSN field of the virtual address VA. The base address of the virtual space page table directory 102 is stored in the page table directory base register 101. The first address register 110 stores the address which comprises a combination of the base address stored in the page table directory base register 101 and the WSN field of the virtual address VA and which designates a page table directory word (PTDW) 106 stored in the virtual space page table directory 102. The page table directory word 106 includes a starting address for the page table 103 and a page table base PTB. The second address register 111 stores the address which comprises a combination of the page table base PTB and the VP# field of the virtual address VA and which designates a page table word (PTW) 107 stored in the page table 103. The page table word 107 comprises a real page address, a main/expanded memory presence bit E indicative of in which memory unit of the main unit 24 or the expanded unit 25 a real page is stored, and a page presence bit P indicative of either presence or absence of the real page in the real memory unit.

It is assumed that the main/expended memory presence bit E represents a logic zero. In this event, the real address in the page table word 107 indicates a starting address for the main memory real pages 104 on the main memory unit 24. The third address register 112 stores a combination of the starting address and the offset field of the virtual address VA as a main memory address MMA which designates a main memory real page 108 which is one of the main memory real pages 104.

On the other hand, it is presumed that the main/expanded memory presence bit E represents a logic one. Under the circumstances, the real address in the page table word 107 indicates a starting address for the expanded memory real pages 105 on the expanded memory unit 25. The address register 113 stores a combination of the starting address and the offset field of the virtual address VA as an expanded memory address EMA which designates an expanded memory real page 109 which is one of the expanded memory real pages 105.

Figure 6A:
FIG. 6A shows a format of a page table word (PTW) for the main memory unit for use in the central processing system depicted in FIG. 1.
Figure 6B:
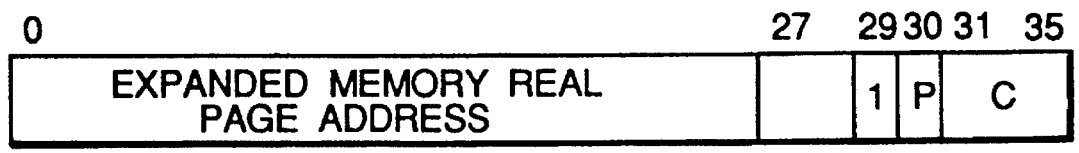
FIG. 6B shows a format of another page table word (PTW) for the expanded memory unit for use in the central processing system depicted in FIG. 1.

FIGS. 6A and 6B show formats of the page table word PTW. FIG. 6A shows a format of the page table word PTW which indicates the real page stored in the main memory unit 24 while FIG. 6B shows another format of the page table word PTW which indicates the real page stored in the expanded memory unit 25. The page table word PTW includes the main/expanded memory presence bit E at bit 29 and a C field indicative of an attribute of the real page.

Figure 7:
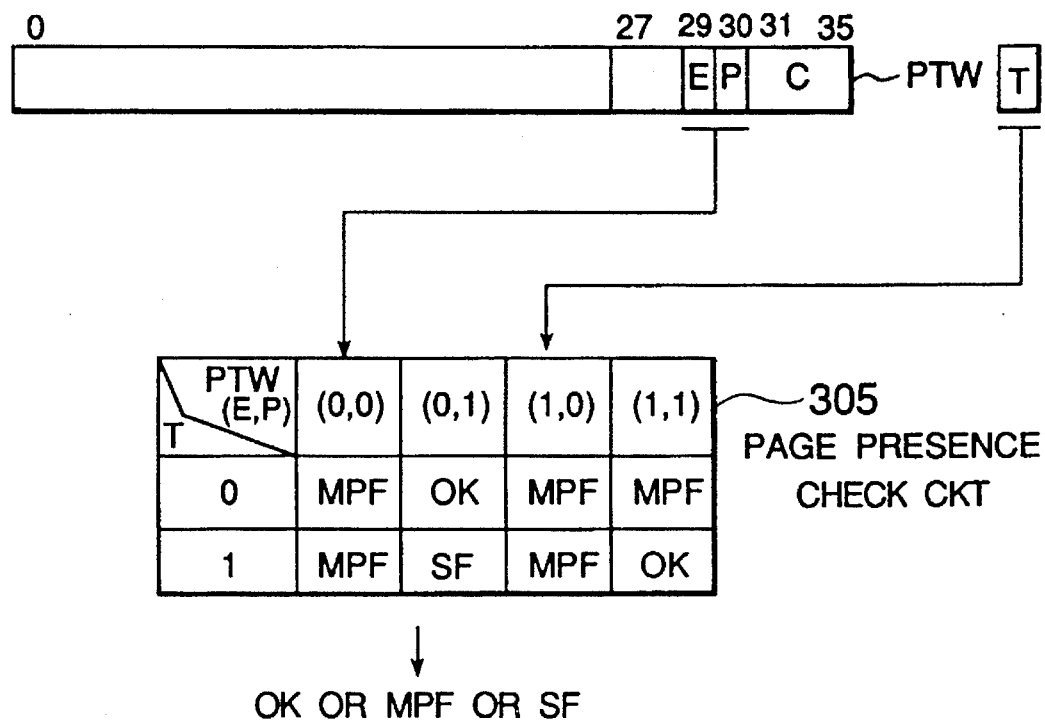
FIG. 7 is a view for use in describing operation of presence check on the basis of an access type and a main/expanded memory presence bit E and a page presence bit P both of which are included in a page table word (PTW)
Figure 8:
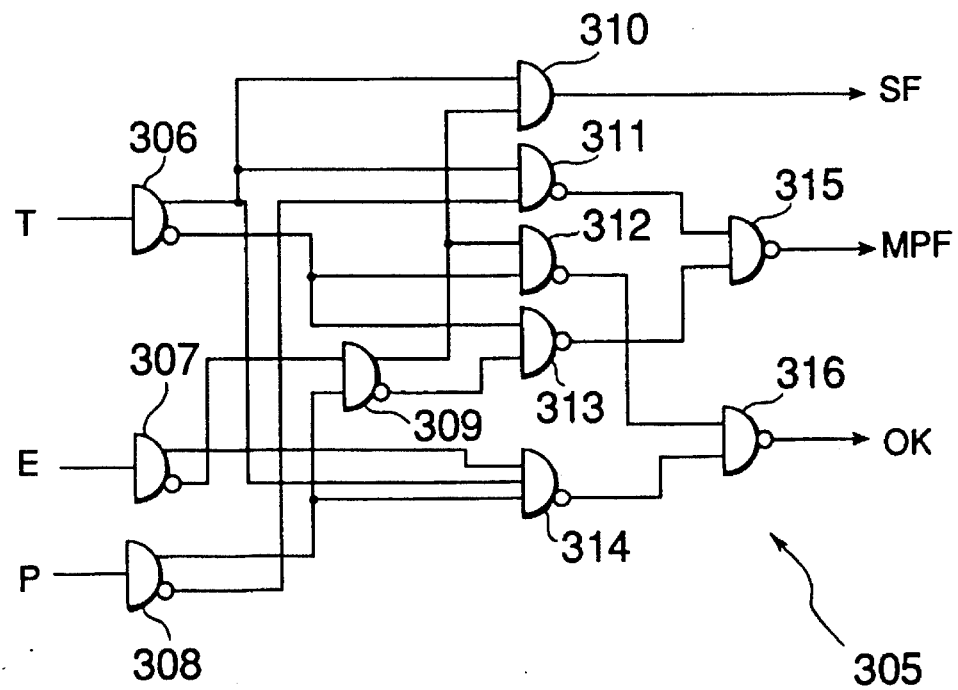
FIG. 8 is a circuit diagram of a page presence check circuit depicted in FIG. 7.

Turning to FIGS. 7 and 8, simultaneously with the above-mentioned address translation process, a page presence check circuit 305 checks either presence or absence of the real page on the real memory unit on the basis of the access type bit T of each operand, and the main/expanded memory presence bit E and the page presence bit P in the page table word PTW. The page presence check circuit 305 generates one of three status words which indicate either one of a missing page fault (MPF) status indicated by an MPF status word, a security fault (SF) status indicated by a SF status word, and an OK status indicated by an OK status word, respectively. The MPF status indicates an absence of the real page corresponding to a given virtual page in the real memory unit. The SF status indicates that the real page which is not allowed to be accessed is to be referred. The OK status indicates that a real address obtained by the address translation is valid because the real page corresponding to the given virtual page is present in the real memory unit and access of this real address is allowable. As illustrated in FIG. 8B, the page presence check circuit 305 comprises first through eleventh gates 306, 307, 308, 309, 310, 311, 312, 313, 314, 315, and 316.

When the OK status word is produced for both of the first and the second operands by the page presence check circuit 305, data transfer starts.

Figure 9:
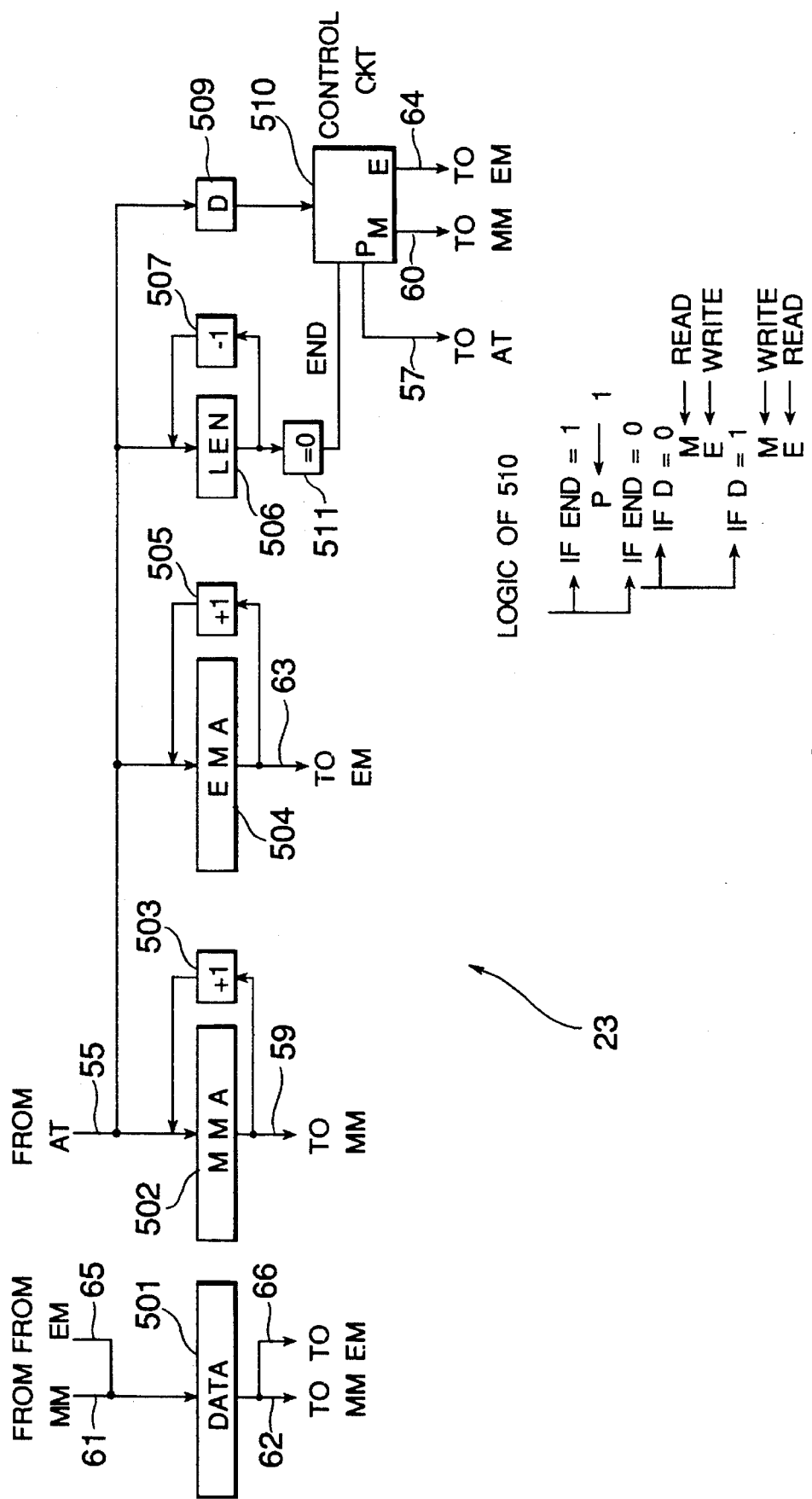
FIG. 9 is a block diagram of a memory control unit used in the central processing system depicted in FIG. 1.

Turning to FIG. 9, description will proceed to the memory control unit 23. The memory control unit 23 controls the data transfer between the main memory unit 24 and the expanded memory unit 25. The memory control unit 23 comprises a data register 501, a main memory address register 502, a first incrementing circuit 503, an extended memory address register 504, a second incrementing circuit 505, a transfer data length register 506, a decrementing circuit 507, a transfer direction register 509, a control circuit 510, and a zero detector 511.

The main memory address register 502 stores the main memory address MMA supplied from the address translation unit 22 via the address bus 55. The stored main memory address MMA is sent to the main memory unit 24 via the address bus 59. Similarly, the expanded memory address register 504 stores the expanded memory address EMA supplied from the address translation unit 22 via the address bus 55. The stored expanded memory address EMA is sent to the expanded memory unit 25 via the address bus 63. In addition, the transfer data length register 506 stores a transfer data length signal LEN supplied from the address translation unit 22 via the address bus 55. The transfer direction register 509 stores a transfer direction signal D supplied from the address translation unit 22 via the address bus 55. For the example being illustrated, the transfer direction signal D represents the logic zero when data should be transferred from the main memory unit 24 to the expanded memory unit 25. When data should be transferred from the expanded memory unit 25 to the main memory unit 24, the transfer direction signal D represents the logic one.

Data is transferred between the main memory unit 24 and the expanded memory unit 25. The main memory address MMA stored in the main memory address register 502 is incremented by one by using the first incrementing circuit 503 by every one transfer cycle. The expanded memory address EMA stored in the expanded memory address register 504 is incremented by one by using the second incrementing circuit 505 by every one transfer cycle. The transfer data length signal LEN stored in the transfer data length register 506 is decremented by one by using the decrementing circuit 511 by every one transfer cycle. The zero detector 511 detects whether or not the stored transfer length signal LEN has a value of zero. When the stored transfer data length signal LEN has the value of zero, the zero detector 511 produces a zero detection signal END. The zero detection signal END is supplied to the control circuit 510. The control circuit 510 is supplied with the transfer direction signal D from the transfer direction register 509. Responsive to the zero detection signal END and the transfer direction signal D, the control circuit 510 produces a command in the manner which is presently described.

When both of the zero detection signal END and the transfer direction signal D represent the logic zero, the control circuit 510 sends a readout command and a writing command to the main memory unit 24 and the expanded memory unit 25 via the command buses 60 and 64, respectively.

When the zero detection signal END represents the logic zero and the transfer direction signal D represents the logic one, the control circuit 510 sends a writing command and a readout command to the main memory unit 24 and the expanded memory unit 25 via the command buses 60 and 64, respectively.

When the zero detection signal END represents the logic one, the control circuit 510 sends a transfer end signal to the address translation unit 22 via the readout data/status bus 57.

Turning back to FIG. 7, execution of the program is interrupted when the page presence check circuit 305 generates the SF status word for either one of the first and the second operands out of the usual access for the real memory unit. On the other hand, the MPF status word for either one of the first and the second operands results in allocation of pages carried out by a control program. The control program is informed of the access type bit T which is a cause of the MPF status. As mentioned above, the MPF status word is generated when the real page corresponding to the given virtual page is not present on the real memory unit. When the MPF status word generates, an exception occurs. Processing of the exception is carried out by the control program.

A little more in detail, there are a first and a second case for the exception. At first, the first case will be described. The second case will be described later in the following.

(1) The first case where the exception occurs in an access for the main memory unit 24, namely, at the main memory access:

(a) When both of the main/expanded memory presence bit E and the page presence bit P represent the logic zero, the real page is not yet prepared or present in an external memory unit. When the real page is not yet prepared, the control program obtains the real page in the manner which is well known in the art. Subsequently, the control program rewrites the page presence bit P of the page table word PTW into the logic one and rewrites the real address field so as to indicate the obtained real page. When the real page is present in the external memory unit, the control program obtains the main memory real page in the manner which is well known in the art and loads the real page. Subsequently, the control program rewrites the page presence bit P of the page table word PTW into the logic one and rewrites the real address field so as to indicate the obtained real page.

(b) When both of the main/expanded memory presence bit E and the page presence bit P represent the logic one, the real page is present in the expanded memory unit 25. In this event, the control program obtains the main memory real page in the manner which is well known in the art and loads the real page from the expanded memory unit 25. Subsequently, the control program rewrites the page presence bit P of the page table word PTW into the logic zero and rewrites the real address field so as to indicate the obtained real page.

(c) When the main/expanded memory presence bit E represents the logic one and the page presence bit P represents the logic zero, the real page is present in the external memory unit. Under the circumstances, the control program obtains the expanded memory real page in the manner which is well known in the art and loads the real page from the external memory unit. Subsequently, the control program rewrites the page presence bit P of the page table word PTW into the logic one and rewrites the real address field so as to indicate the obtained real page.

(2) The second case where the exception occurs in an access for the expanded memory unit 25, namely, at the expanded memory access:

(a) When both of the main/expanded memory presence bit E and the page presence bit P represent the logic zero, the real page is either not yet prepared or present in the external memory unit. When the real page is not yet prepared, the control program obtains the expanded real page in the manner which is well known in the art. Subsequently, the control program rewrites both of the main/expanded memory presence bit E and the page presence bit P of the page table word PTW into the logic one. When the real page is present in the external memory unit, execution of the program is interrupted in the similar manner as the SF status is generated. This is because the main memory page is about to access by the expanded memory access.

(b) When the main/expanded memory presence bit E represents the logic one and the page presence bit P represents the logic zero, the real page is present in the external memory unit. In this event, the control program obtains the expanded memory real page in the manner which is well known in the art and loads the real page from the external memory unit. Subsequently, the control program rewrites the page presence bit P of the page table word PTW into the logic one and rewrites the real address field so as to indicate the obtained real page.

Figure 10:
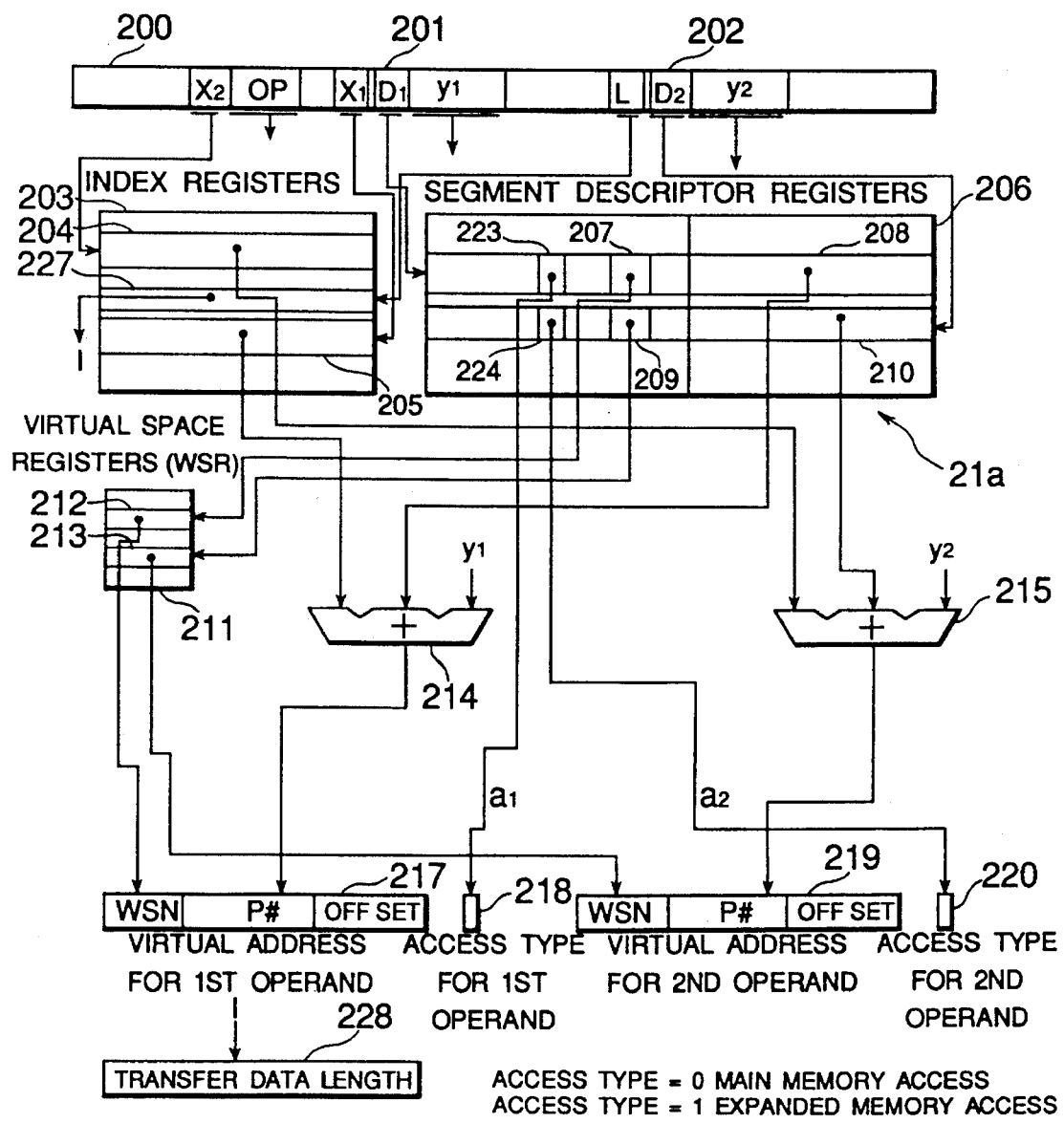
FIG. 10 is a block diagram of another instruction processing unit used in the central processing system depicted in FIG. 1.

Turning to FIG. 10, description will proceed to another instruction processing unit 21a used in the central processing system depicted in FIG. 1. The instruction processing unit 21a is similar to that illustrated in FIG. 3 except for determination of the access type in the manner which will later be described.

Referring to FIGS. 4A and 4B again, the segment descriptor has the flag field (Flag) including the expanded memory bit, namely, bit 22 indicative of the access type. When the expanded memory bit (bit 22) has the logic zero, the access type designates the main memory access. On the other hand, the access type designates the expanded memory access when the expanded memory bit (bit 22) has the logic one. In other words, the expanded memory bit indicates which memory unit is the optimum one for the segments in question, the main memory unit 24 or the expanded memory unit 25.

Turning back to FIG. 10, the D1 field of the first operand descriptor 201 indicates the segment descriptor register which stores not only the virtual space register number 207 and the base field 208 but also an expanded memory bit (bit 22) 223. The D2 field of the second operand descriptor 202 indicates the segment descriptor register which stores another expanded memory bit (bit 22) 224 as well as the virtual space register number 209 and another base field 210. The expanded memory bit 223 is stored in the first access type register 218 as the first access type bit a1 indicative of the access type for the first operand while the expanded memory bit 224 is stored in the second access type register 220 as the second access type bit a2 indicative of the access type for the second operand.

Figure 11:
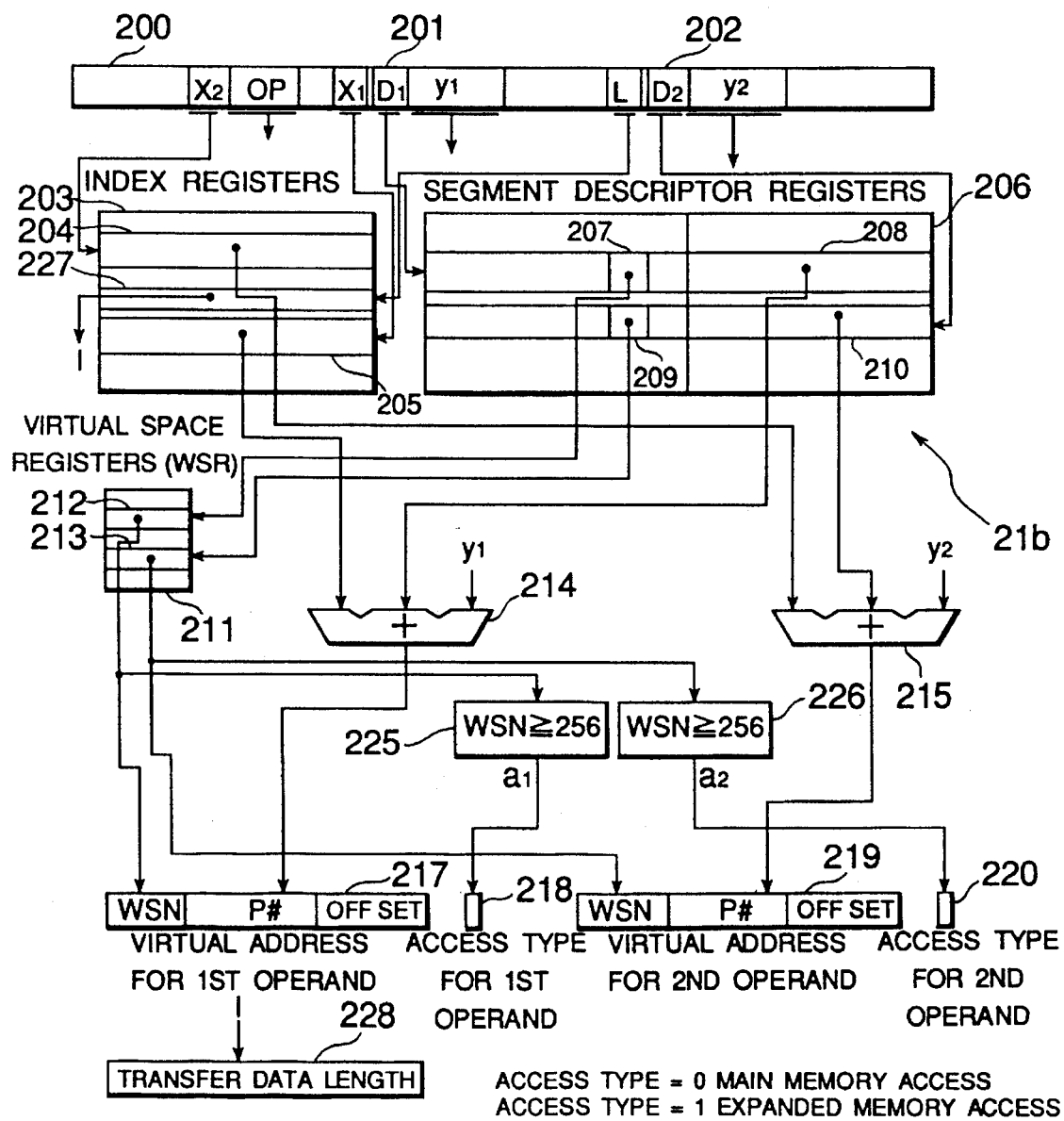
FIG. 11 is a block diagram of still another instruction processing unit used in the central processing system depicted in FIG. 1.

Turning to FIG. 11, description will proceed to still another instruction processing unit 21b used in the central processing system depicted in FIG. 1. The instruction processing unit 21b is similar to that illustrated in FIG. 3 except that it comprises first and second access type determining circuits 225 and 226 in place of the access type determiner 216. For the example being illustrated, the access type is defined as the expanded memory access when the virtual space number WSN is not less than two hundred and fifty-six. Otherwise, the access type is defined as the main memory access. The virtual space number WSN stored in the virtual space register 212 is supplied to the first access type determining circuit 225. The first access type determining circuit 225 determines the access type for the first operand on the basis of the supplied virtual space number WSN. The first access type determining circuit 225 supplies a determined access type to the first access type register 218 as the first access type bit a1 indicative of the access type for the first operand. Likewise, the virtual space number WSN stored in the virtual space register 213 is supplied to the second access type determining circuit 226. The second access type determining circuit 226 determines the access type for the second operand on the basis of the supplied virtual space number WSN. The second access type determining circuit 226 supplies a determined access type to the second access type register 220 as the second access type bit a2 indicative of the access type for the second operand. At any rate, each of the first and the second access type determining circuits 225 and 226 determines which memory unit is the optimum one for a designated virtual space, the main memory unit 24 or the expanded memory unit 25.

As apparent from the above-mentioned description, it is possible for the information processing system according to the present invention to control the expanded memory unit 25 in accordance with the virtual address VA. In addition, it is possible to carry out address translation for the expanded memory unit 25 at a high speed. Furthermore, it is possible to effectively reallocate pages at a high speed by using the access type bit T newly introduced by the present invention and the main/expanded memory bit E in the page table.

While this invention has thus far been described in conjunction with a few preferred embodiments thereof, it will now be readily possible for those skilled in the art to put this invention into practice in various other manners.

What is claimed is:

1. An information processing system comprising:

a main memory unit operable at a relatively high speed and having a relatively small storage capacity;

an expanded memory unit operable at a relatively low speed and having a relatively large storage capacity, a combination of said main memory unit and said expanded memory unit being operable as a real memory unit;

an instruction processing unit producing a virtual address; and an address translation table for translating said virtual address into a real address, said address translation table storing page table words, each of said page table words including a real page address corresponding to a virtual page address, a main/expanded memory presence bit corresponding to the real page address, and a page presence bit corresponding to the real page address, said main/expanded memory presence bit indicating to which memory unit of said main memory unit and said expanded memory unit a real page, indicated by said real page address, is to be loaded, said page presence bit indicating whether said real page is present in said real memory unit, wherein said main memory unit is accessible when said main/expanded memory presence bit indicates that said real page should be stored in said main memory unit and when said page presence bit indicates presence of said real page in said real memory unit, said expanded memory unit is accessible when said main/expanded memory presence bit indicates that said real page should be stored in said expanded memory unit and when said page presence bit indicates presence of said real page in said real memory unit, said real page is loaded into said main memory unit after production of a missing page fault when said main/expanded memory presence bit indicates that said real page should be stored in said main memory unit and when said page presence bit indicates absence of said real page in said real memory unit, and said real page is loaded into said expanded memory unit after production of the missing page fault when said main/expanded memory presence bit indicates that said real page should be stored in said expanded memory unit and when said page presence bit indicates absence of said real page in said real memory unit.

2. An information processing system comprising:

a main memory unit operable at a relatively high speed and having a relatively small storage capacity;

an expanded memory unit operable at a relatively low speed and having a relatively large storage capacity, a combination of said main memory unit and said expanded memory unit being operable as a real memory unit;

an instruction processing unit for processing an instruction word for accessing at least one operand to produce a virtual address, said instruction processing unit including access type determining means for determining an access type for said at least one operand on the basis of information included in said instruction word, said access type indicating which memory unit of said main memory unit and said expanded memory unit is an optimum one for said at least one operand, said access type determining means producing an access type bit indicative of said access type; and an address translation table for translating said virtual address into a real address, said address translation table storing page table words, each of said page table words including a real page address corresponding to a virtual page address, a main/expanded memory presence bit corresponding to the real page address, and a page presence bit corresponding to the real page address, said main/expanded memory presence bit indicating to which memory unit of said main memory unit and said expanded memory unit a real pages is to be loaded, said page presence bit indicating whether said real page is present in said real memory unit, wherein said main memory unit is accessible when said main/expanded memory presence bit indicates that said real page should be stored in said main memory unit and when said page presence bit indicates presence of said real page in said real memory unit, said expanded memory unit is accessible when said main/expanded memory presence bit indicates that said real page should be stored in said expanded memory unit and when said page presence bit indicates presence of said real page in said real memory unit, said real page is loaded into said main memory unit after production of a missing page fault when said main/expanded memory presence bit indicates that said real page should be stored in said main memory unit and when said page presence bit indicates absence of said real page in said real memory unit, and said real page is loaded into said expanded memory unit after production of the missing page fault when said main/expanded memory presence bit indicates that said real page should be stored in said expanded memory unit and when said page presence bit indicates absence of said real page in said real memory unit.

3. An information processing system comprising:

a main memory unit operable at a relatively high speed and having a relatively small storage capacity;

an expanded memory unit operable at a relatively low speed and having a relatively large storage capacity, a combination of said main memory unit and said expanded memory unit being operable as a real memory unit;

an instruction processing unit for processing an instruction for accessing at least one operand to produce a virtual address, said instruction processing unit including segment descriptor registers for storing segment descriptors each defining a segment which is a logical data block, each of said segment descriptors including a start virtual address, a segment size, and an expanded memory bit indicating which of said main memory unit and said expanded memory unit is the optimum one for said segment, each of said segment descriptor registers producing the expanded memory bit as an access type bit for said at least one operand;

an address translation table for translating said virtual address into a real address, said address translation table storing page table words, each of said page table words including a real page address corresponding to a virtual page address, a main/expanded memory presence bit corresponding to the real page address, and a page presence bit corresponding to the real page address, said main/expanded memory presence bit indicating to which memory unit of said main memory unit and said expanded memory unit a real page is to be loaded, said page presence bit indicating whether said real page is present in said real memory unit; and a page presence check circuit for checking for presence of said real page on said real memory unit on the basis of said access type bit, said main/expanded memory presence bit, and said page presence bit, said page presence check circuit producing one of a missing page fault status, a security fault status, and an OK status, said missing page fault status indicating an absence of said real page in said real memory unit, said security fault status indicating that said real page is not allowed to be accessed and is to be referred, and said OK status indicating that said real address is valid because the real page is present in the real memory unit and access of the real page is allowable.

4. An information processing system comprising:

a main memory unit operable at a relatively high speed and having a relatively small storage capacity;

an expanded memory unit operable at a relatively low speed and having a relatively large storage capacity, a combination of said main memory unit and said expanded memory unit being operable as a real memory unit;

an instruction processing unit for processing an instruction for accessing at least one operand to produce a virtual address, said instruction processing unit including means for indicating virtual space numbers identifying a plurality of virtual spaces and means for specifying which of said main memory unit and said expanded memory unit is the optimum one for holding information which resides in a designated virtual space to produce an access type bit for said at least one operand;

an address translation table for translating said virtual address into a real address, said address translation table storing page table words, each of said page table words including a real page address corresponding to a virtual page address, a main/expanded memory presence bit corresponding to the real page address, and a page presence bit corresponding to the real page address, said main/expanded memory presence bit indicating to which memory unit of said main memory unit and said expanded memory unit a real page is to be loaded, said page presence bit indicating whether said real page is present in said real memory unit; and a page presence check circuit for checking presence of said real page on said real memory unit on the basis of said access type bit, said main/expanded memory presence bit, and said page presence bit, said page presence check circuit producing one of a missing page fault status, a security fault status, and an OK status, said missing page fault status indicating an absence of said real page in said real memory unit, said security fault status indicating that said real page is not allowed to be accessed and is to be referred, and said OK status indicating that said real address is valid because the real page is present in the real memory unit and access of the real page is allowable.

* * * * *